(12) United States Patent
Pistoia et al.

(10) Patent No.: US 8,898,188 B2
(45) Date of Patent: Nov. 25, 2014

(54) STRING ANALYSIS BASED ON THREE-VALUED LOGIC

(75) Inventors: Marco Pistoia, Amawalk, NY (US);
Omer Tripp, Har-Adar (IL); Takaaki Tateishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/154,986

(22) Filed: Jun. 7, 2011

(65) Prior Publication Data

US 2012/0317143 A1    Dec. 13, 2012

(51) Int. Cl.
*G06F 17/30*    (2006.01)
*G06F 11/36*    (2006.01)

(52) U.S. Cl.
CPC ........ *G06F 11/3608* (2013.01); *G06F 2201/81* (2013.01)
USPC ........................................................ 707/771

(58) Field of Classification Search
USPC ........................................................ 707/771
See application file for complete search history.

(56) References Cited

U.S. PATENT DOCUMENTS 5,398,199 A * 3/1995 Lefons .......................... 708/446

OTHER PUBLICATIONS

Yasuhiko Minamide, "Static Approximation of Dynamically Generated Web Pages," May 10-14, 2005, Chiba, Japan.
Peter Kelb et al., "Mosel: A Sound and Efficient Tool for M2L (Str)", Jan. 1997, pp. 448-451.
Shmuel Sagiv et al., "Parametric Shape Analysis Via 3-valued Logic," ACM Transactions on Programming Languages and Systems, vol. 24, No. 3, May 2002, pp. 271-298.
Tal Lev-Ami et al., "Putting Static Analysis to Work for Verification: A Case Study," Jan. 2000, Portland, Oregon, pp. 26-38.

* cited by examiner

*Primary Examiner* — Hosain Alam
*Assistant Examiner* — Johnese Johnson
(74) *Attorney, Agent, or Firm* — Kunzler Law Group (57) ABSTRACT

Performing string analysis based on three-valued logic by including expressing a property of a string in a computer software application as a three-valued logic shape predicate, performing a three-valued logic shape analysis using the shape predicate to reach a fixpoint solution, and evaluating the fixpoint solution to determine a three-valued logic value of the property.

19 Claims, 5 Drawing Sheets

```
HttpServletRequest req;
...
String userId = req.getParameter("userId");
String idPrefix = userId.substring(0, 4);
String delimiter = ":";
idPrefix = idPrefix + delimiter;
String reformattedUserId = idPrefix + userId.substring(4);
RespHtml.render(reformattedUserId);
```

(E v,v'. reformattedUserId(v) & next(v,v') & 'j'(v')) &

(E v, v', v''. reformattedUserId(v) & next(v,v') & next(v',v'') & 'a'(v')) &

...

(E v_1,...,v_11. reformattedUserId(v) & next(v_1,v_2) & ... & next(v_10,v_11) & ':'(v_11)).

STRING ANALYSIS BASED ON THREE-VALUED LOGIC

FIELD

The subject matter disclosed herein relates to analysis of computer-based software applications.

BACKGROUND

Description of the Related Art

Static analysis of a computer-based software application refers to an analysis of the application that is performed without executing the application. Static analysis is typically performed on the instruction code of an application to identify issues within the instruction code, such as logic errors and security vulnerabilities. One type of static analysis, known as string analysis, is used to identify string values that may arise during the execution of an application. String analysis may be used in conjunction with other types of static analysis, such as with taint analysis to test countermeasures that an application uses to protect itself against malicious attacks through tainted variables. For example, if taint analysis determines that a string is passed to a print function within an application, string analysis may be used to determine whether the string may include the '<' character, which would indicate a possible vulnerability to a cross-site scripting (XSS) attack. However, known string analysis techniques often embody a fixed degree of precision (e.g., by representing all strings as a regular expression or as a context-free grammar), and cannot be specialized for the string queries that are given as inputs. Thus, known string analysis techniques are typically not precise enough for some queries and overly precise for others. Moreover, known string analysis techniques typically have difficulty reasoning about cyclic definitions of string variables, such as those arising when a string is manipulated inside a loop or a recursive procedure.

BRIEF SUMMARY

In one aspect of the invention a method is provided for performing string analysis based on three-valued logic, the method including expressing a property of a string in a computer software application as a three-valued logic shape predicate, performing a three-valued logic shape analysis using the shape predicate to reach a fixpoint solution, and evaluating the fixpoint solution to determine a three-valued logic value of the property. An apparatus and computer-program product embodying the invention are also provided.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In another embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1A:
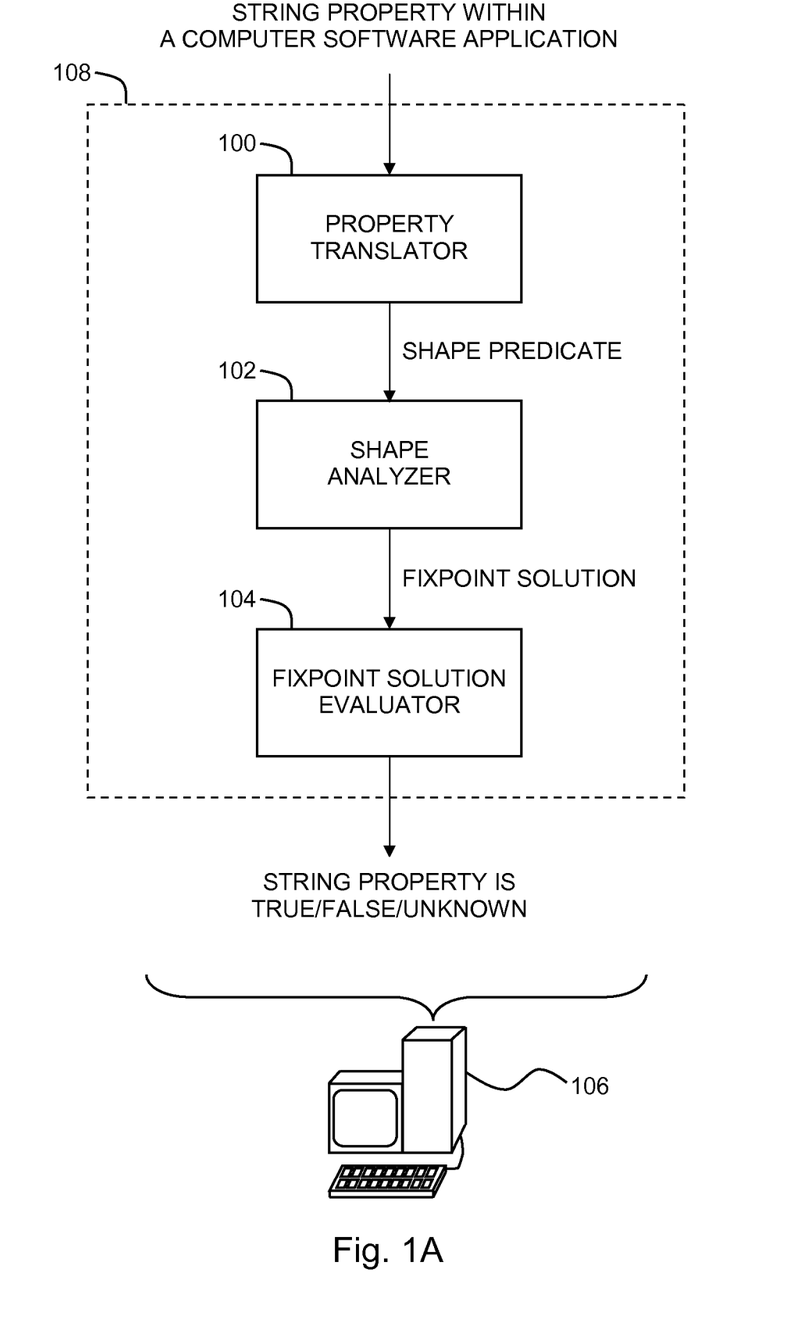
FIGS. 1A and 1B, taken together, are a simplified conceptual illustration of an apparatus for performing string analysis based on three-valued logic, constructed and operative in accordance with an embodiment of the invention.
Figure 1B:
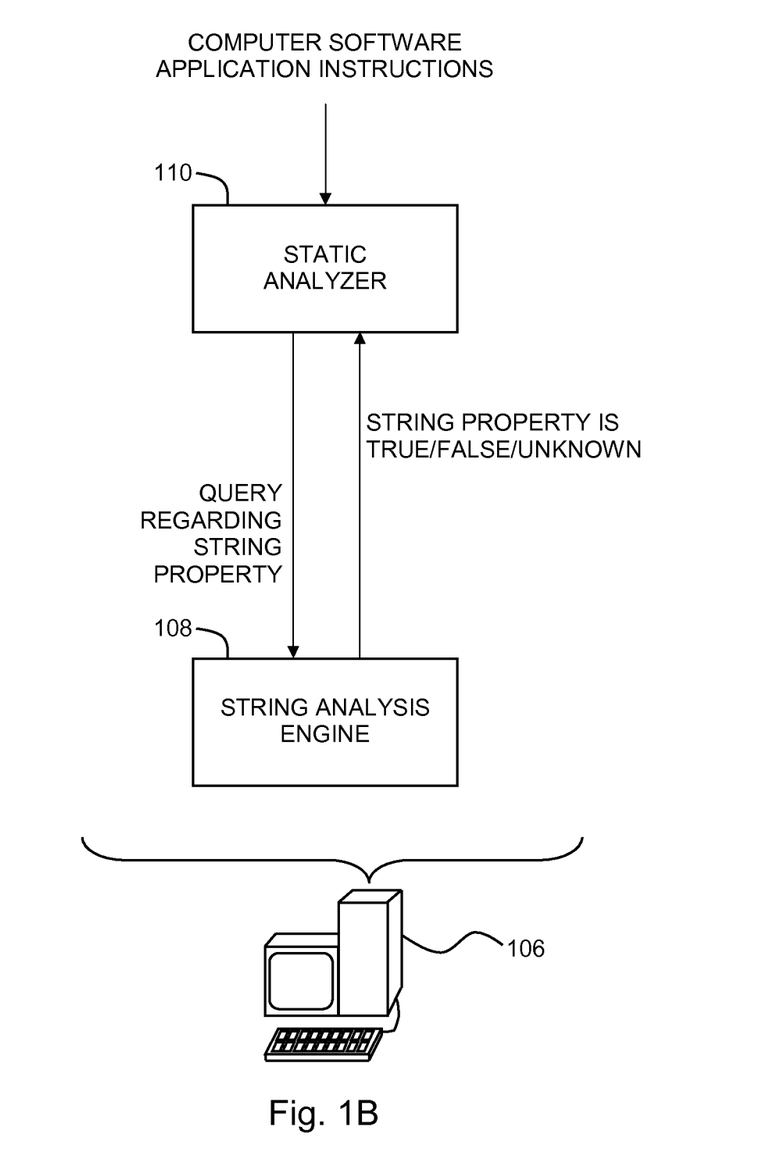

Reference is now made to FIGS. 1A and 1B, which, taken together, is a simplified conceptual illustration of an apparatus for performing string analysis based on three-valued logic, constructed and operative in accordance with an embodiment of the invention. In the apparatus of FIG. 1A, one or more properties are defined with respect to one or more strings at one or more locations within the instruction set of a computer software application, where the properties are defined in accordance with conventional string analysis techniques, such as in the form of one or more queries. For example, a query may ask if a string pointed to by variable V at instruction L satisfies the property of having a length that is less than 5 characters. A property translator 100 is configured to express the string properties as one or more three-valued logic shape predicates. A shape analyzer 102 is configured to perform a three-valued logic shape analysis using the shape predicates to reach a fixpoint solution. A fixpoint solution evaluator 104 is configured to evaluate the fixpoint solution to determine if the properties are true or false, and/or if the fixpoint solution represents concrete values that satisfy the property and concrete values that do not satisfy the property, such as where an indefinite value of ½ is assigned to the relevant predicates.

Property translator 100, shape analyzer 102, and fixpoint solution evaluator 104 may be embodied in a string analysis engine 108 that may receive a query regarding a string property from a static analyzer 110 and report to static analyzer 110 whether the property is true, false, or otherwise as described above, such as is shown more particularly with reference to FIG. 1B. The static analyzer 110 may employ static program-analysis techniques to compute a conservative approximation of string values arising at runtime.

Any of the elements shown in FIG. 1 are preferably implemented by one or more computers, such as a computer 106, by implementing any of the elements shown in FIG. 1 in computer hardware and/or in computer software embodied in a non-transient, computer-readable medium in accordance with conventional techniques.

Figure 2:
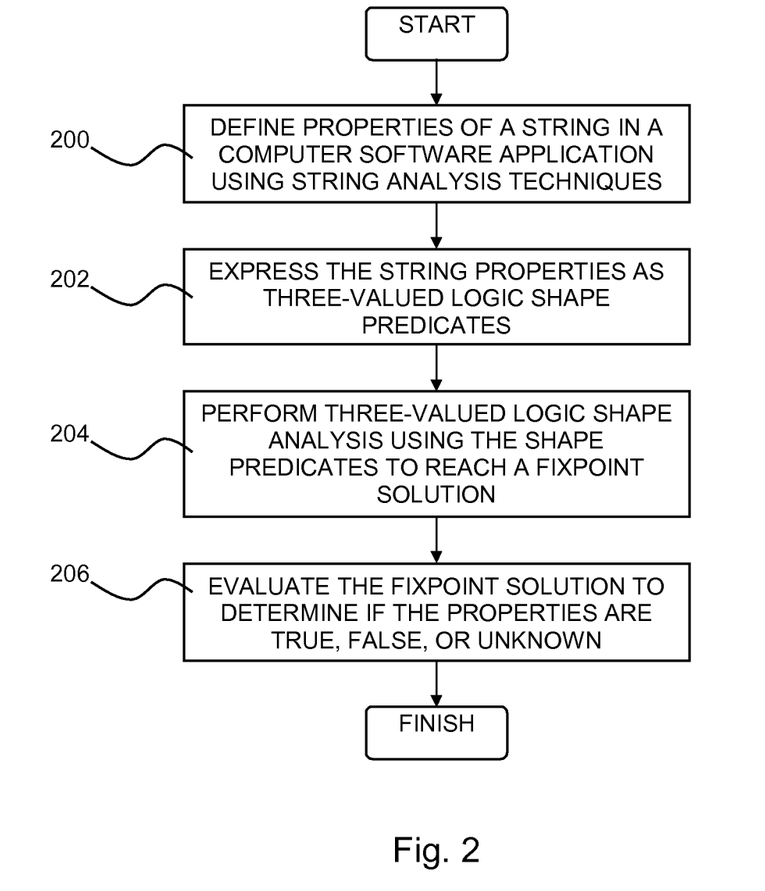
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, one or more properties are defined with respect to one or more strings at one or more locations within the instruction set of a computer software application, where the properties are defined in accordance with conventional string analysis techniques, such as in the form of one or more queries (step 200). For example, a query may ask if a string pointed to by variable V at instruction L satisfies the property of having a length that is less than 5 characters. The string properties are expressed as one or more three-valued logic shape predicates (step 202). A three-valued logic shape analysis is performed using the shape predicates to reach a fixpoint solution (step 204). The fixpoint solution is then evaluated to determine if the properties are true or false, or if the fixpoint solution represents concrete values that satisfy the property and concrete values that do not satisfy the property (step 206).

In the system of FIG. 1 and method of FIG. 2, a string may be understood as a singly-linked list of characters. Each node in the linked list thus has two fields: a data field storing a character value and a pointer field pointing to the node's successor in the linked list or having a null value. Operations on strings thus naturally translate to operations on linked lists. For example, concatenation of string values may be modeled by appending linked lists, and removal of characters from a string may be modeled by removing nodes from a linked list. Manipulation of strings via indices may be modeled by treating indices as environment variables pointing into a heap. For example, the statement "int i=s.indexOf('c')" may be encoded where the environment variable i points to the first node in the linked list corresponding to s, such that that node's data field is 'c'. A three-valued logic predicate may be created relating variable i to the first node in the linked list whose data field has value 'c', such as index_i(v), where v is the first node.

Figure 3A:
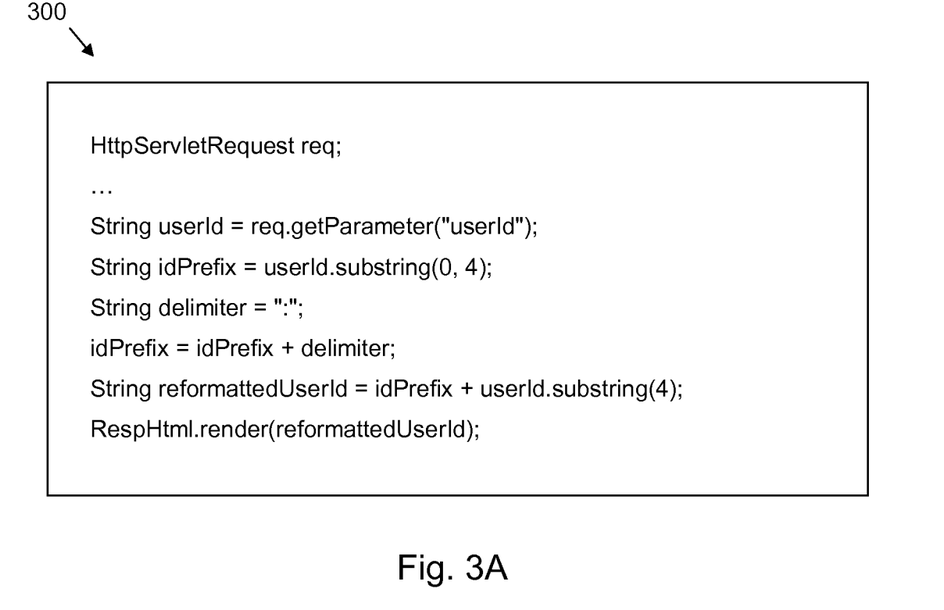
FIGS. 3A and 3B are simplified examples of instruction code to which the system of FIG. 1 and the method of FIG. 2 are applicable.

In one embodiment, the three-valued logic shape predicate uses a binary successor predicate to enforce order between characters of the string and a unary is-letter[z] predicate template to denote a value of each character in the string where z is a letter of the string instantiating the predicate. A first-order formula ranges over the three-valued logic shape predicate and comprises an existential quantifier, the binary successor predicate that holds for a first element v and a second element v' if v' is a successor of v in a linked-list representation of the string, and the unary is-letter[z] predicate template Application of the system of FIG. 1 and method of FIG. 2 may be demonstrated in the context of the following example of FIGS. 3A and 3B. Given the simplified computer application instruction set shown in FIG. 3A at reference numeral 300, string analysis is performed to evaluate the property "does not start with 'javascript:'" with respect to the string pointed to by 'reformattedUserId'.

Figure 3B:
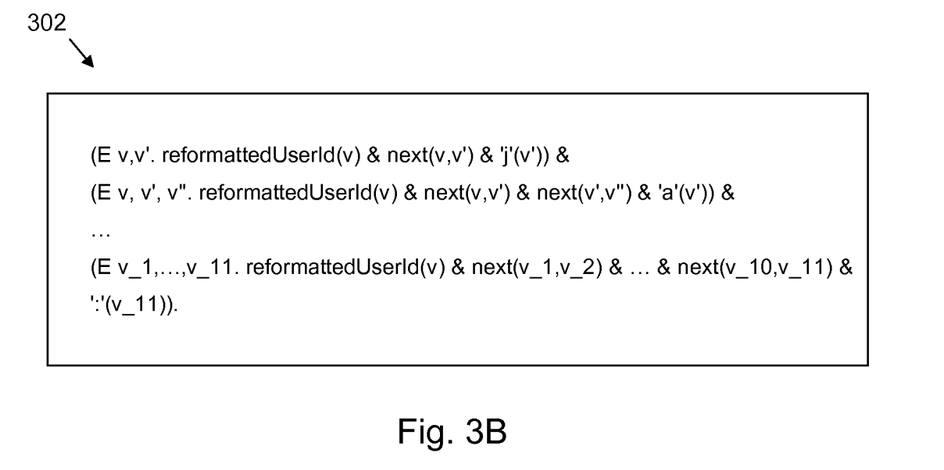

The property is expressed as a three-valued logic shape predicate as shown in FIG. 3B at reference numeral 302, where 'E' denotes 'exists' and '&' denotes the logical 'AND' connector. 'next(v,v')' is a binary predicate that holds if v' is the successor of v in a linked-list representation of the string pointed to by 'reformattedUserId'. 'reformattedUserId(v)' indicates that variable 'reformattedUserId' points to v. Finally, 'c'(v) indicates that the value of the data field of element v is the character 'c'. Three-valued logic shape analysis is performed using the shape predicate to reach a fixpoint solution. The fixpoint solution is then evaluated to determine if the property is true or false, or if the fixpoint solution represents concrete values that satisfy the property and concrete values that do not satisfy the property.

Figure 4:
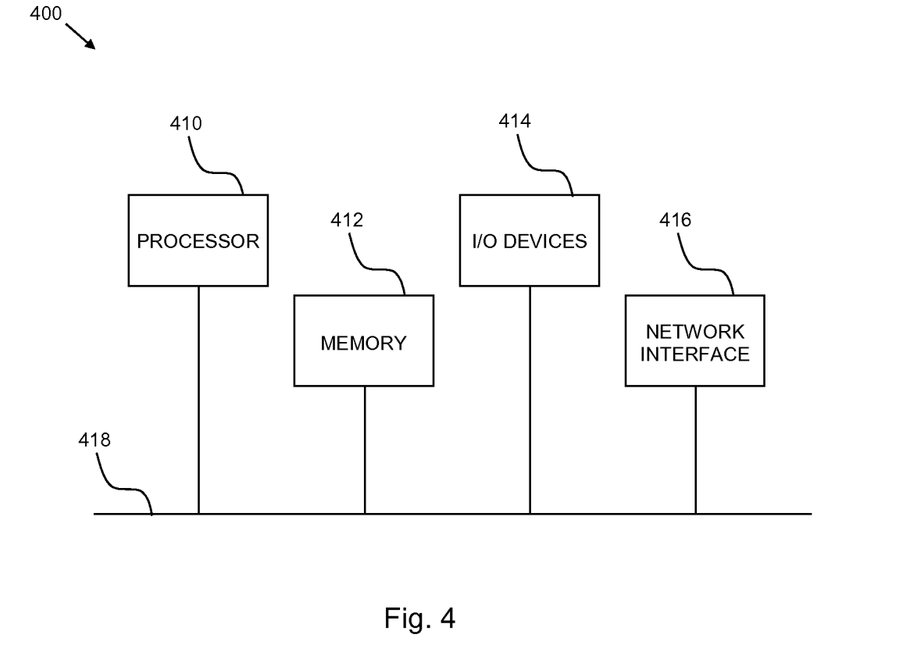
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, input/output (I/O) devices 414, and a network interface 416, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processor 410 may be shared by other processors 410.

The term "memory" as used herein is intended to include memory associated with a processor or CPU, such as, for example, RAM, ROM, a fixed memory device (e.g., hard drive), a removable memory device (e.g., diskette), flash memory, etc. Such memory 412 may be considered a computer readable storage medium.

The I/O device 414 as used herein is intended to include, for example, one or more input devices (e.g., keyboard, mouse, scanner, etc.) for entering data to the processing unit, and/or one or more output devices (e.g., speaker, display, printer, etc.) for presenting results associated with the processor 410. The network interface 416 includes any interface port, interface connection, and/or interface medium (e.g. Ethernet, Token Ring, Bluetooth, Wifi, etc.) for communicating with other processing devices.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing string analysis, the method comprising:
   expressing, by use of a processor, a property of a string in a computer software application as a three-valued logic shape predicate;
   performing a three-valued logic shape analysis using the three-valued shape predicate to reach a fixpoint solution; and
   evaluating the fixpoint solution to determine a three-valued logic value of the property, wherein the three-valued logic shape predicate uses a binary successor predicate to enforce order between characters of the string and a unary is-letter [z] predicate template to denote a value of each character in the string where z is a letter of the string instantiating the three-valued logic shape predicate.

2. The method of claim 1 where the property is defined in the form of a query.

3. The method of claim 2 and further comprising receiving the query from a static analyzer.

4. The method of claim 1 where the evaluating comprises evaluating the fixpoint solution to determine if the fixpoint solution is true.

5. The method of claim 4 and further comprising reporting the evaluation to a static analyzer.

6. The method of claim 1, wherein a first-order formula ranges over the three-valued logic shape predicate and comprises an existential quantifier, the binary successor predicate that holds for a first element v and a second element v' if v' is a successor of v in a linked-list representation of the string, and the unary is-letter [z] predicate template.

7. An apparatus comprising:
   a computer readable storage medium storing computer readable program code executable by a processor, the computer readable program code comprising:
   a property translator configured to express a property of a string in a computer software application as a three-valued logic shape predicate;
   a shape analyzer configured to perform a three-valued logic shape analysis using the three-valued shape predicate to reach a fixpoint solution; and
   a fixpoint solution evaluator configured to evaluate the fixpoint solution to determine a three-valued logic value of the property, wherein the three-valued logic shape predicate uses a binary successor predicate to enforce order between characters of the string and a unary is-letter [z] predicate template denote a value of each character in the string where z is a letter of the string instantiating the three-valued logic shape predicate.

8. The apparatus of claim 7 where the property is defined in the form of a query.

9. The apparatus of claim 8 where the property translator, shape analyzer, and fixpoint solution evaluator are embodied in a string analysis engine configured to receive the query from a static analyzer.

10. The apparatus of claim 7, where the fixpoint solution evaluator is configured to evaluate the fixpoint solution to determine if the fixpoint solution represents concrete values that satisfy the property and concrete values that do not satisfy the property.

11. The apparatus of claim 10, where the fixpoint solution evaluator is configured to report the evaluation to a static analyzer.

12. The apparatus of claim 7, wherein a first-order formula ranges over the three-valued logic shape predicate and comprises an existential quantifier, the binary successor predicate that holds for a first element v and a second element v' if v' is a successor of v in a linked-list representation of the string, and the unary is-letter [z] predicate template.

13. A computer program product for performing string analysis, the computer program product comprising:
a non-transitory computer readable storage medium having computer readable program code embodied therein, the computer readable program code configured to:
express a property of a string in a computer software application as a three-valued logic shape predicate;
perform a three-valued logic shape analysis using the three-valued shape predicate to reach a fixpoint solution; and
evaluate the fixpoint solution to determine a three-valued logic value of the property, wherein the three-valued logic shape predicate uses a binary successor predicate to enforce order between characters of the string and a unary is-letter [z] predicate template denote a value of each character in the string where z is a letter of the string instantiating the three-valued logic shape predicate.

14. The computer program product of claim 13, where the property is defined in the form of a query.

15. The computer program product of claim 14, where the computer-readable program code is configured to receive the query from a static analyzer.

16. The computer program product of claim 13, where the computer-readable program code is configured to evaluate the fixpoint solution to determine if the fixpoint solution represents concrete values that satisfy the property and concrete values that do not satisfy the property.

17. The computer program product of claim 16, where the computer-readable program code is configured to report the evaluation to a static analyzer.

18. The computer program product of claim 13, wherein a first-order formula ranges over the three-valued logic shape predicate and comprises an existential quantifier, the binary successor predicate that holds for a first element v and a second element v' if v' is a successor of v in a linked-list representation of the string, and the unary is-letter [z] predicate template.

19. The method for deploying a computer program product, comprising integrating computer readable program code into a computing system, wherein the code in combination with the computing system performs the following:
expressing, by use of a processor, a property of a string in a computer software application as a three-valued logic shape predicate;
performing a three-valued logic shape analysis using the three-valued shape predicate to reach a fixpoint solution; and
evaluating the fixpoint solution to determine a three-valued logic value of the property, wherein the three-valued logic shape predicate uses a binary successor predicate to enforce order between characters of the string and a unary is-letter [z] predicate template to denote a value of each character in the string where z is a letter of the string instantiating the three-valued logic shape predicate.

* * * * *